(12) United States Patent
Legros

(10) Patent No.: US 8,089,179 B2
(45) Date of Patent: Jan. 3, 2012

(54) HYBRID AIRCRAFT ELECTRICAL ARCHITECTURE WITH BOTH VARIABLE AND CONSTANT FREQUENCY GENERATORS

(75) Inventor: Craig R. Legros, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 385 days.

(21) Appl. No.: 12/406,992

(22) Filed: Mar. 19, 2009

(65) Prior Publication Data

US 2010/0237733 A1 Sep. 23, 2010

(51) Int. Cl.
*H02P 9/00* (2006.01)
*B60L 1/00* (2006.01)

(52) U.S. Cl. ........... 307/84; 307/9.1; 307/16; 290/52

(58) Field of Classification Search ............ 307/16, 307/43–44, 47, 68, 84; 290/4 R, 4 C, 34, 290/52
See application file for complete search history.

(56) References Cited

U.S. PATENT DOCUMENTS

| | | | | |
|---|---|---|---|---|
| 2,892,098 | A * | 6/1959 | Bergvall | 307/84 |
| 3,858,107 | A * | 12/1974 | Yarrow et al. | 322/26 |
| 4,684,873 | A * | 8/1987 | Glennon | 322/47 |
| 4,967,097 | A * | 10/1990 | Mehl | 307/84 |
| 5,281,905 | A * | 1/1994 | Dhyanchand et al. | 322/32 |
| 5,977,645 | A * | 11/1999 | Glennon | 290/40 F |
| 6,699,151 | B2 * | 3/2004 | Grogg et al. | 475/88 |
| 6,700,212 | B2 | 3/2004 | Ackermann et al. | |
| 6,703,756 | B2 | 3/2004 | Reutlinger | |
| 6,719,656 | B2 | 4/2004 | Bowen | |
| 6,725,989 | B1 | 4/2004 | Krisher et al. | |
| 6,733,411 | B1 | 5/2004 | Kaplan et al. | |
| 6,838,778 | B1 | 1/2005 | Kandil et al. | |
| 7,064,455 | B2 * | 6/2006 | Lando | 290/1 C |
| 7,253,535 | B2 | 8/2007 | Duesterhoeft | |
| 7,292,003 | B1 | 11/2007 | Baker | |
| 8,018,086 | B2 * | 9/2011 | Legros | 307/9.1 |
| 2006/0043923 | A1 | 3/2006 | Baker et al. | |
| 2010/0133813 | A1 * | 6/2010 | Cote et al. | 290/32 |

* cited by examiner

*Primary Examiner* — Burton Mullins
(74) *Attorney, Agent, or Firm* — Carlson, Gaskey & Olds, PC

(57) ABSTRACT

An electrical generation system utilizes a variable frequency generator operating in combination with a constant frequency generator. Also disclosed and claimed are an aircraft electrical architecture, and a gas turbine engine incorporating the above electrical generation system.

6 Claims, 1 Drawing Sheet

HYBRID AIRCRAFT ELECTRICAL ARCHITECTURE WITH BOTH VARIABLE AND CONSTANT FREQUENCY GENERATORS

BACKGROUND OF THE INVENTION

This application relates to an electrical generation system for use in an aircraft environment wherein a pair of generators is associated with a gas turbine engine, with one generator being constant frequency, and the other being a variable frequency generator.

Aircraft are typically provided with gas turbine engines, which include turbine rotors that rotate to provide power. Generators are associated with these gas turbine engines, and generate electricity from the rotation of a shaft driven by the turbine rotors. The electricity is utilized for various functions on the aircraft, including providing electric power to systems associated with the gas turbine engines, as well as providing electricity to other uses on the aircraft.

A gas turbine engine can rotate at varying speed. A simple generator driven by such an engine will generate a variable frequency.

It is known to provide a gas turbine engine with a pair of generators. In some cases, the generators have been variable frequency.

It is also known to provide a pair of constant frequency generators on a gas turbine engine. A constant frequency generator adapts to the engine's speed variation such that the generator still provides a constant speed and thus constant frequency output.

More recently, for several reasons, aircraft designers have wanted to utilize variable frequency generators. The use of the variable frequency generators raises some challenges, such as large, sustained, torsional oscillating loads in associated gear boxes, and a resultant increase in size and weight. Further, there is a limited no break power transfer (NBPT) capability. Also, many components associated with an aircraft require constant frequency power. Thus, complex motor controls have needed to be associated with each of these components to take the variable frequency electric power provided, and transform that into constant frequency power.

SUMMARY OF THE INVENTION

An electrical generation system utilizes a variable frequency generator operating in combination with a constant frequency generator. Also disclosed and claimed are an aircraft electrical architecture, and a gas turbine engine incorporating the above electrical generation system.

These and other features of the present invention can be best understood from the following specification and drawings, the following of which is a brief description.

DETAILED DESCRIPTION OF THE PREFERRED EMBODIMENT

Figure 1:
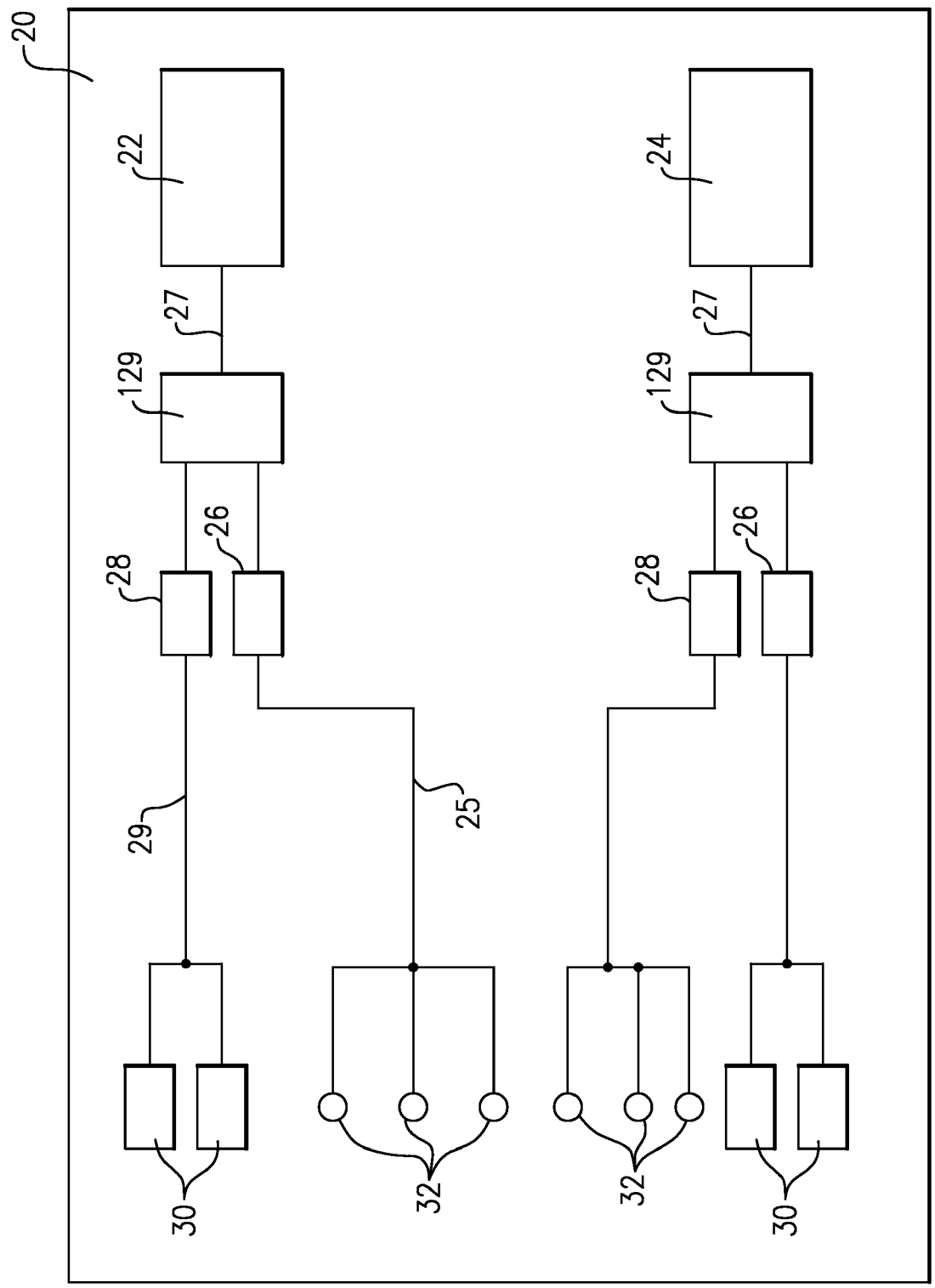
FIG. 1 schematically shows an aircraft incorporating the present invention.

An aircraft 20 is illustrated schematically in FIG. 1 incorporating a pair of gas turbine engines 22 and 24. As known, the gas turbine engines include a turbine rotor that is driven to rotate by products of combustion.

The rotation of the turbine rotor drives a shaft 27, which drives a gearbox 129, which in turn drives two different shafts, each of which powers one of the generators (items 26 & 28) in each engine 22 and 24. The shafts are associated with generators 26 and 28, both shown schematically. As known, as the shaft rotates within the generators 26 and 28, electricity is generated. As disclosed, the generator 28 is a variable frequency generator, and provides variable frequency power to a bus 29.

The generator 26 is a constant frequency generator, and may be as known in the art and available from Hamilton Sundstrand Corporation.

One known constant frequency generator is disclosed, as an example, in U.S. Pat. No. 6,838,778. These generators have not been utilized in combination with a variable frequency generator associated with the same gas turbine engine. The constant frequency generator 26 delivers electricity to a bus 25.

In the aircraft 20 as illustrated in FIG. 1, a number of components 30 are associated with the bus 29. In general, these are components that can utilize variable frequency power. As such, they do not require a complex controller.

The bus 25, which is delivering constant frequency power, is associated with other components 32 which do require constant frequency power.

With the above described architecture, the system does not require motor controllers for each of the components 32, as has been the case in the past. Thus, the present invention provides a hybrid architecture with the benefits of both variable and constant frequency generator.

The constant frequency generator adapts to a speed of the engine, and still provides a constant speed, and thus constant frequency output. The output is AC constant frequency power.

What is claimed is:

1. A generation system comprising:
    a variable frequency generator for taking rotation from a rotating member and generating power having a variable frequency;
    a constant frequency generator for taking rotation from the rotating member and generating power having a constant frequency; and
    said constant frequency generator adapting to a speed of the rotating member, and still providing a constant speed, and thus constant frequency output, said variable frequency, generator providing power to a variable frequency bus, and said constant frequency generator providing power to a constant frequency bus, with components requiring constant frequency associated with said constant frequency bus, and components associated with said variable frequency bus being components that can operate on variable frequency, such that said variable frequency bus and said constant frequency bus power different components.

2. The generation system as set forth in claim 1, wherein said constant frequency power is AC power.

3. An aircraft electrical architecture comprising:
    at least one gas turbine engine, said gas turbine engine being associated with a variable frequency generator and a constant frequency generator, said variable frequency generator being operable to take rotation of a shaft associated with said gas turbine engine, and generate power having a variable frequency to be supplied to a variable frequency bus;
    said constant frequency generator also taking rotation of said shaft and generating power having a constant frequency to be supplied to a constant frequency bus;

a system that requires power of constant frequency being powered by said constant frequency bus; and said constant frequency generator adapting to a speed of the shaft, and still providing a constant speed, and thus constant frequency output, said variable frequency generator providing power to a variable frequency bus, and said constant frequency generator providing power to a constant frequency bus, with components requiring constant frequency associated with said constant frequency bus to power said system, and components associated with said variable frequency bus being components that can operate on variable frequency, such that said variable frequency bus and said constant frequency bus power different components.

4. The aircraft electrical architecture as set forth in claim 3, wherein said constant frequency power is AC power.

5. A gas turbine engine comprising:

a turbine engine having a shaft to be driven for rotation through an engine mounted accessory gearbox, a variable frequency generator and a constant frequency generator; and said variable frequency generator being operable to generate power having a variable frequency from rotation of the shaft to be supplied to a variable frequency bus;

said constant frequency generator generating power having a constant frequency from rotation of the shaft to be supplied to a constant frequency bus; and said constant frequency generator adapting to a speed of the shaft, and still providing a constant speed, and thus constant frequency output, said variable frequency generator providing power to a variable frequency bus, and said constant frequency generator providing power to a constant frequency bus, with components requiring constant frequency associated with said constant frequency bus, and components associated with said variable frequency bus being components that can operate on variable frequency, such that said variable frequency bus and said constant frequency bus power different components.

6. The gas turbine engine as set forth in claim 5, wherein said constant frequency power is AC power.

* * * * *